G. D. JACOBY.
TIRE-UPSETTER.
No. 175,995.
Patented April 11, 1876.
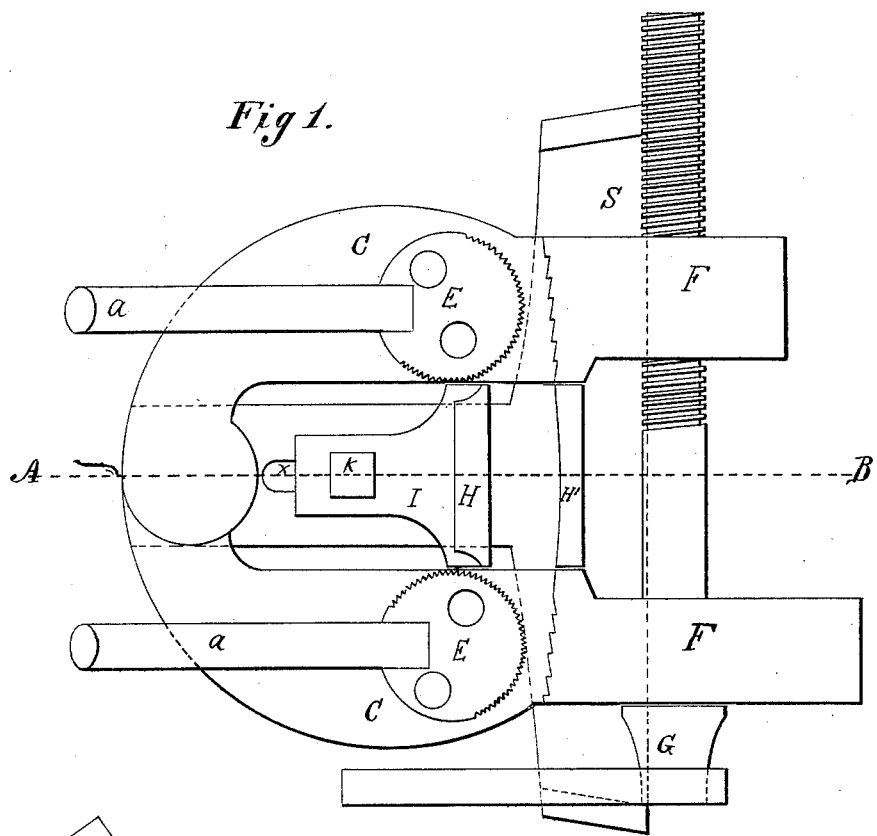
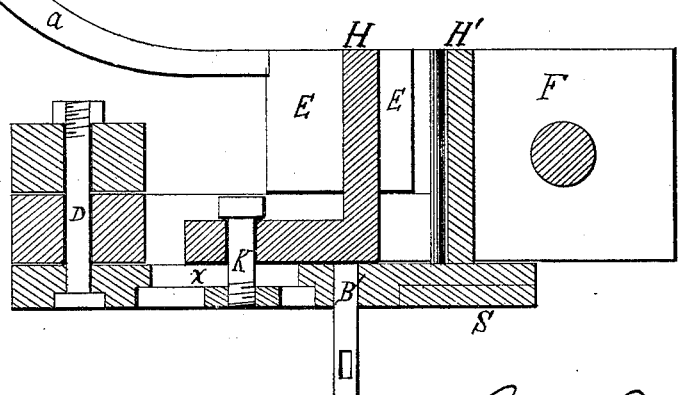
WITNESSES:
George D. Jacoby
INVENTOR.
J. McC. Perkins
ATTORNEY.

UNITED STATES PATENT OFFICE.

GEORGE D. JACOBY, OF BERWICK, PENNSYLVANIA, ASSIGNOR OF ONE-HALF HIS RIGHT TO WILLIAM B. FREASE, OF SAME PLACE.

IMPROVEMENT IN TIRE-UPSETTERS.

Specification forming part of Letters Patent No. 175,995, dated April 11, 1876; application filed March 27, 1876.

*To all whom it may concern:*

Be it known that I, GEORGE D. JACOBY, of Berwick, in the county of Columbia and State of Pennsylvania, have invented certain new and useful Improvements in Tire-Upsetting Machines; and I do hereby declare that the following is a full, clear, and exact description thereof that will enable others skilled in the art to which it appertains to make and use the same, reference being had to the accompanying drawings and to the letters and figures of reference marked thereon, which form a part of this specification.

The same letters and figures of reference are used to indicate the corresponding parts. After describing the invention, its nature and extent will be shown in the claim.

My invention relates to upsetting tires, and is an improvement upon Letters Patent No. 171,225, dated December 21, 1875, granted to me.

The object of my present improvement is to furnish a machine which will prevent the curving or buckling of the tire between the eccentrics during the shrinking by the eccentrics.

Figure 1 is a plan view, and Fig. 2 is a vertical sectional view through the line A B.

S is the standard, T-shaped, depending from which is the pin B', which secures the machine to the blacksmith's anvil. C C are the jaws, pivoted together and to the standard by the bolt D. E E are eccentrics, each revolvable upon a steel rod fastened to the jaws C C. About one-half of the perimeter of each of these eccentrics is corrugated. The jaws C C are provided with the lugs F F, one of which is slotted laterally and the other provided with a female screw. G is the shaft which plays in the lateral slot, the end of which shaft is provided with a male screw, which engages the female screw of the other lug. The shaft G holds the jaws C C closely together, or they may be separated, as may be desired, by turning the screw-head of the shaft G. I is a kind of movable apron, which carries the vertical wall H forward or backward, to or from H'. This apron is fastened to the standard by the bolt K, which moves in the oblong slot X in the standard. H' is a vertical wall, concave on its inner side, which is placed between the lugs F F of the jaws C C. The walls H H' are moved so closely together that the tire cannot bend or buckle while the operation of shrinking is going on by means of the eccentric E E.

This prevents the evil of buckling or bending of the tire complained of in my former invention.

Having now fully described my invention, what I claim, and desire to secure by Letters Patent, is—

The standard S, provided with the jaws C C, pivoted at D, in combination with the corrugated eccentrics E E, the corrugated lugs F F, shaft G, and walls H H' substantially as described and for the purposes set forth.

In testimony that I claim the foregoing I have hereunto set my hand this 24th day of March, 1876.

GEO. D. JACOBY.

Witnesses:
 JOHN W. FRAZEE,
 FREDC. G. YOUNG.